United States Patent
Jansen et al.

(10) Patent No.: US 9,291,462 B2
(45) Date of Patent: Mar. 22, 2016

(54) METHOD FOR POSITION DETERMINATION FOR A MOTOR VEHICLE

(75) Inventors: Axel Jansen, Munich (DE); Robert Hein, Blonhofen (DE); Roland Bader, Munich (DE); Carsten Isert, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 759 days.

(21) Appl. No.: 13/021,205

(22) Filed: Feb. 4, 2011

(65) Prior Publication Data
US 2011/0196608 A1 Aug. 11, 2011

(30) Foreign Application Priority Data
Feb. 6, 2010 (DE) .......................... 10 2010 007 091

(51) Int. Cl.
| | |
|---|---|
| *G01C 21/30* | (2006.01) |
| *G01C 21/26* | (2006.01) |
| *G01C 21/00* | (2006.01) |
| *G09B 29/10* | (2006.01) |
| *G08G 1/0969* | (2006.01) |

(52) U.S. Cl.
CPC ....................................... *G01C 21/30* (2013.01)

(58) Field of Classification Search
CPC ........ G01C 21/30; G01C 21/26; G01C 21/00; G08G 1/0969
USPC ........................................................ 701/208
See application file for complete search history.

(56) References Cited

U.S. PATENT DOCUMENTS

| | | | |
|---|---|---|---|
| 2001/0056326 A1* | 12/2001 | Kimura ......................... | 701/208 |
| 2003/0023369 A1 | 1/2003 | Takashima | |
| 2008/0077322 A1 | 3/2008 | Sumizawa | |
| 2008/0214152 A1* | 9/2008 | Ramer et al. ............... | 455/414.1 |
| 2009/0228204 A1 | 9/2009 | Zavoli et al. | |

FOREIGN PATENT DOCUMENTS

| | | |
|---|---|---|
| EP | 1 674 827 A1 | 6/2006 |
| EP | 1 959 236 A1 | 8/2008 |
| WO | WO 2008/146899 A1 | 12/2008 |

OTHER PUBLICATIONS

German Search Report dated Oct. 7, 2010 with partial English translation (nine (9) pages).

* cited by examiner

*Primary Examiner* — Helal A Algahaim
*Assistant Examiner* — Charles J Han
(74) *Attorney, Agent, or Firm* — Crowell & Moring LLP

(57) ABSTRACT

A method for position determination for a motor vehicle includes the acts of: satellite based determination of a geographical position of the motor vehicle, providing digital road map data, which include at least information about road segments in the surroundings of the geographical position; carrying out a first determining step for determining at least a first road segment, on which the motor vehicle is located with high probability, wherein the first determining step is based on a matching of the geographical position with the digital road map data; retrieval of traffic lane data, regarding at least the number of traffic lanes for the first road segment, from the road map database; determining the traffic lane, in which the motor vehicle is currently traveling, by use of at least the traffic lane data; and carrying out a second determining step for determining a second road segment, on which the motor vehicle is located with high probability, wherein the second determining step is based on a matching of the geographical position with the digital road map data and at least the traffic lane, in which the vehicle is traveling.

17 Claims, 1 Drawing Sheet

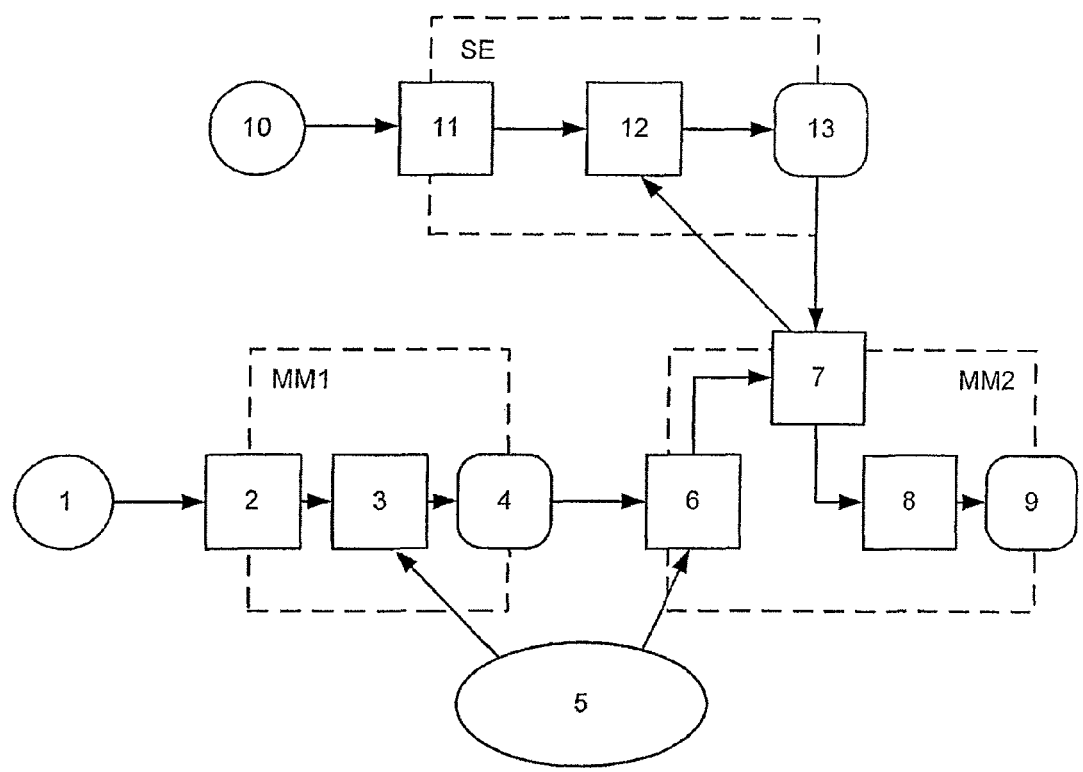

METHOD FOR POSITION DETERMINATION FOR A MOTOR VEHICLE

CROSS-REFERENCE TO RELATED APPLICATION

This application claims priority under 35 U.S.C. §119 to German Patent Application No. DE 10 2010 007 091.2, filed Feb. 6, 2010, the entire disclosure of which is herein expressly incorporated by reference.

BACKGROUND AND SUMMARY OF THE INVENTION

The invention relates to a method for position determination for a motor vehicle.

Known methods for position determination for a motor vehicle often comprise a satellite based determination of a geographical position of the motor vehicle; providing digital road map data, which include at least information about road segments in the surroundings of the geographical position; and determining a road segment, on which the motor vehicle is located with high probability, by matching the geographical position with the digital road map data.

The object of the invention is to provide an improved method for position determination for a motor vehicle.

This and other objects are achieved by a method that is intended for position determination for a motor vehicle and that has the following steps:

(a) satellite based determination of a geographical position of the motor vehicle;

(b) providing digital road map data, which include at least information about road segments in the surroundings of the geographical position;

(c) carrying out a first determining step for determining at least a first road segment, on which the motor vehicle is located with high probability, wherein the first determining step is based on a matching of the geographical position with the digital road map data;

(d) retrieval of traffic lane data, regarding at least the number of traffic lanes for the first road segment, from the road map database;

(e) determining the traffic lane, in which the motor vehicle is currently traveling, by use of at least the traffic lane data; and (f) carrying out a second determining step for determining a second road segment, on which the motor vehicle is located with high probability, wherein the second determining step is based on a matching of the geographical position with the digital road map data and at least the traffic lane, in which the vehicle is traveling.

Thus, the multi-step method according to the invention also includes the acquired information regarding the traffic lane, in which the vehicle is currently traveling, in the map matching process. In this way better decisions can be made, especially in ambiguous situations. The method allows the position to be determined in a better and more reliable way than the known methods from the prior art. The advantages are especially noticeable at the entrance and exit ramps, in particular at the entrance and exit ramps of highways.

In addition, the acquired information regarding the traffic lane, in which the vehicle is currently traveling, can be used for a lane-specific route guidance and corresponding lane change instructions.

Preferably, the second determining step is based on a matching of the geographical position with the digital road map data; the traffic lane, in which the vehicle is traveling; and at least additional traffic lane information. Therefore, in addition to the traffic lane, in which the vehicle is currently traveling, still more lane information is included in the determining step. In this way the accuracy and the reliability can be enhanced even more. The additional traffic lane information can originate, in particular, directly from the lane data, retrieved from the road map database. However, the additional lane information can also be acquired elsewhere—in particular, camera-based. For example, the additional traffic lane information can include the number of lanes, instructions regarding a user restriction for a specific lane (for example, a bus lane), instructions regarding the usage restriction for a specific lane (corresponding to the widely spread lane markings in the area leading up to the road intersections—for example, "left turn arrow"), instructions regarding a suggested utilization for a specific lane, and/or information regarding a distant destination that can be reached by using a specific lane (corresponding somewhat to lane markings known from many highways, in particular in the area leading up to highway intersections and interchanges—for example, "in the direction of . . . "). In the case of a camera-based acquisition of additional traffic lane information, the camera-based acquisition can be based, in particular, on the camera-based detection of at least a marking that is actually physically arranged on the respective lane and/or based on the camera-based detection of at least one traffic sign that is allocated to at least the respective lane.

According to a preferred embodiment of the invention, the lane, in which the motor vehicle is currently traveling, is determined in a camera-based manner. Thus, the "on-board" acquired information regarding the lane, in which the motor vehicle is currently traveling, is linked in an especially advantageous way to the lane data, retrieved from the road map database. A camera-based determination is technically feasible, in particular, because of the good optical detectability of lane boundary markings that are physically present typically on the side. In this respect different kinds of such lane markings can be differentiated especially by means of their type and thickness.

According to another preferred embodiment of the invention, a lane model of the first road segment is created on the basis of the lane data for the purpose of the second determining step, and the determination of the lane, in which the motor vehicle is currently traveling, is carried out based on the information of the traffic lane model. The use of such a traffic lane model allows, inter alia, an efficient and consistent processing of a variety of traffic lane data.

Such a traffic lane model can include, in particular, information regarding the number of traffic lanes of the first road segment. This information can relate, in particular, to information regarding the exclusion and inclusion of traffic lanes. In this case the traffic lane model can comprise, on the one hand, information regarding the exclusion and inclusion of traffic lanes within the first road segment and, on the other hand, information regarding the exclusion and inclusion of traffic lanes with respect to at least one adjacent road segment. A traffic lane model that is especially easy to utilize is one that has information regarding the exclusion and inclusion of lanes with respect to a road segment, on which the vehicle has traveled before, in particular on which the vehicle has traveled last.

As an alternative or in addition, the traffic lane model can include information regarding the course and/or the arrangement of the individual traffic lanes on the first road segment.

As another alternative or in addition, the traffic lane model can include information regarding the interconnections between the first road segment and other road segments.

According to a preferred embodiment of the invention, the traffic lane model is virtually "driven through" to some extent as a function of the variation over time of the (geo) position of the motor vehicle that can be detected repeatedly in a preferably continuous or quasi-continuous manner. Hence, an absolute position and lane determination is not newly carried out in each computing step, but rather the last computed position and/or lane information is used at least to some extent, in particular at least for the purposes of a plausibility check. The method executing system, in particular an on-board computer of the motor vehicle "remembers" to some extent the lane, in which the vehicle is currently traveling. Preferably, the resulting "remembered" or rather buffered information about the lane, in which the vehicle is currently traveling, is updated, when changes in the lanes (for example, the inclusion or exclusion of lateral lanes) are recorded in the digital map and/or are contained in the lane model, which is built at least partially from the digital map data.

A traffic lane model, which is enriched with a plurality of data, and optionally the addition of information, acquired on the basis of a sensor, can make it possible to determine in a clear and unambiguous way the position of the motor vehicle and/or the lane, in which the vehicle is traveling, and/or the road segment, on which the vehicle is traveling, by many methods and to some extent in different ways. In such cases it can be advantageous to execute, in addition to a first determination in a first way, a second determination in a second way so as to be checked for plausibility and/or redundancy.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a schematic drawing of a two step map matching method in accordance with an embodiment of the invention.

DETAILED DESCRIPTION OF THE DRAWING

A so-called "map matching" or "map fixing" method is generally defined as a method, in which the (geo) position of an object, in particular of a motor vehicle, is measured by a location finding system and then matched with the location information, in particular the road network, of a digital map. If the geographic coordinates of an object that are measured by location finding method were to be mapped directly (that is, without map matching) into the coordinate system of a digital map, then the position (entered on the map) of the object in relation to the objects (also entered on the map) and/or the features in its environment would usually deviate from the actual position of the object in relation to the objects and/or features in its environment. Then, for example, a motor vehicle would often be shown on the map next to a road (on which the vehicle is currently traveling). Possible causes are, on the one hand, the measurement inaccuracies of the position finding method and, on the other hand, the inaccuracies of the map. Since especially for navigation applications the true position relative to the objects and/or features have to be known and correctly shown on a map, map matching methods match the measured (geo) position with the map information about the position and geometry of the objects and/or features on the map in such a way that the most plausible position of the object on the map is determined.

The prior art discloses a plurality of map matching systems and map matching methods. They usually map the current position of the vehicle in a single working step on a digital map. In so doing, both the accuracy of the positioning sensor system and also the resolution of the digital map have a decisive effect on the quality of the mapping.

Usually the road network, on which the position of the vehicle is to be mapped, is modeled by way of graphs. In these graphs the individual edges match the individual road sections and/or segments. However, this approach typically measures only the road, on which the vehicle is currently traveling. The traffic lane, in which the vehicle is currently traveling, is not determined.

There exist strategies, where the road graphs that are used do not model the course of the roads, but rather the exact course of the individual lanes on the roads. Thus, the method is based on traffic lane graphs. However, the creation of these traffic lane graphs requires a time-consuming surveying of every individual road. In addition, the position of the vehicle can be mapped on these traffic lane graphs by means of suitable map matching methods only with highly accurate position information as the input variables.

In the proposed method, the map matching procedure is divided essentially into two steps for the purpose of a lane-specific localization of the vehicle. In the first step the road segment, on which the vehicle is most likely located, is determined and then transmitted to the second step. In the second step a more accurate model (lane model) of this road segment is reconstructed on the digital road map by means of additional information. This traffic lane model contains, inter alia, the course and arrangement of the individual lanes on this road segment.

In addition to the information about the course and arrangement of the individual traffic lanes on the respective road segment, the traffic lane model also preferably contains information about the kind of lane marking, in particular its type and its thickness. This information is also preferably comprised by the lane data, retrieved from the road map database. Then a sensor, which is additionally mounted on the motor vehicle, preferably an optical sensor, in particular a camera, can be used in order to record the lane markings that are, in fact, physically present on the road surface of the traffic lane, in which the vehicle is currently traveling, and, if desired, to recognize said markings with the aid of image processing. By matching the resulting recorded and/or recognized lane markings with the information that relates to the type of lane markings and that is stored in the digital maps and integrated into the traffic lane model, it is possible to determine the lane, in which the vehicle is currently traveling.

Special advantages of the proposed procedure are the result of its use of two steps. However, it is also very important in the proposed procedure that the first step delivers results that are already robust and stable, because an error in the first step renders the exact localization in the second step impossible. The first step represents in essence a conventional map matching procedure. Since, however, the model, which is created in the second step, and the acquired information are fed back to the first step, the results of the first step are improved as compared to the conventional map matching procedure.

FIG. 1 is a schematic drawing depicting the design of the two step map matching procedure. A first step MM1 of the map matching procedure (see block MM1 "map matching step 1") receives from a positioning module 2 (here a GPS receiver) a rough position indication (here on the basis of signals of a GPS infrastructure, see block 1 "GPS"). Then a database, in which a digital map is stored (see block 5 "map database"), is used to determine and retrieve (block 3 "segment selection") all road segments, which lie in a defined radius around this position indication.

The resulting candidate segments are evaluated according to certain defined criteria. The segment with the highest probability is selected as the road segment, on which the vehicle is currently traveling (block 4 "current segment").

The road segment, which is determined in the first step MM1 of the map matching procedure, serves as the input for a second step MM2 of the map matching procedure (see block MM2 "map matching step 2"). In the second step MM2 all of the available extended information for the selected road segment is retrieved from the digital map (see block 5 "map database") and assigned to the road segment (block 6 "extension of the segment"). On the basis of the extended information assigned to the road segment, a model of the individual traffic lanes on this road segment is created (block 7 "traffic lane model"). This traffic lane model contains the exact number of lanes and the way in which the traffic lanes have changed since the last road segment. In addition, this traffic lane model can be used to determine which lane leads to which road segment.

Lane information, which has been extended for selected road segments (for example, so-called "extended lane information") is already stored in the digital road map. With the aid of this information it is possible to reconstruct the exact course of the individual lanes. For these segments and for each lane thereof the file already contains the information to which lane and to which segment this lane leads. The fact that the information can be combined and processed in a model-like manner in the traffic lane model used in the present invention also enables a reliable recognition and precise definition of lane changes. In this context the concept "lane changes" is defined as the inclusion or exclusion of individual lanes. To this end each lane of the current segment is checked as to how the respective lane can be reached from which segments and, above all, from which lanes of these segments. Thus, the traffic lane model enables, in a manner of speaking, a "backwards" directed view, starting from a specific lane, whereas the extended lane information of the digital map yields explicitly for each segment only "forward" directed information.

Moreover, the type of lane marking is stored for each lane. Thus, the overall result is a traffic lane model, in which the information stored relates exactly to the lane and the segment, from which the current lane can be reached; to the segments and the lanes, to which the lanes of the current segment lead; and to the type of lane markings of the individual lanes. Even the total number of traffic lanes is also implicitly included. The resulting traffic lane model represents a detailed, but abstract reconstruction of the actually existing lane situation on the road.

The information about the number of lanes and the change in the lanes since the last road segment (as well as optionally additional information from the traffic lane model 7) is delivered to a lane detection model SE, which determines (see block "current lane" 13) the lane, in which the vehicle is currently traveling, by means of this information and an additional sensor system.

A sensor that can be used as an additional sensor in the present case is a camera 10, by which traffic information 11 is delivered. In a process step 12 (see block 12 "merging of information") the lane information 11 is merged with the information from the traffic lane model 7, in order to determine the current lane 13.

Working on this basis, the camera (or, more particularly, its downstream image processing) recognizes the type and thickness of the left and right lane marking or rather the edge of the road. These features are matched with the knowledge about the type and number of lanes stored in the traffic lane model. Then the current lane is determined by use of a logic operation.

Since in cases of up to three lanes the results can only be unambiguous lane marking situations, only these situations have to be recognized and classified. Thus, the individual situations can be distinguished by the type and place of the lane marking. In the case of a three-lane road the result is, for example, the three cases:

(1) continuous line on the left and dashed line on the right;
(2) dashed line on the left and the right; and
(3) continuous line on the right and dashed line on the left.

In cases of roads having more than three lanes, the executed lane change must also be detected and included. By integrating the executed lane change it is possible to determine again the current lane at any point in time, provided that it can be assumed that the vehicle did not start on a road having four or more lanes (a feature that will usually match the facts), but rather always in a clear and unambiguous lane marking situation.

Since the detection range (or rather the exploitable detection range) of the camera that is used will usually be limited to the lane in which the vehicle is currently traveling, it is usually not possible to recognize in a reliable way, on the basis of a camera, the lane changes on the left and the right next to the current lane. Therefore, the lane detection module SE is informed when and/or where the number of lanes changes. This information is derived from the traffic lane model. If lanes are included from the left side, they are simply added to the current lane. If lanes drop away on the left side of the vehicle, then the number of excluded lanes is subtracted from the current lane. Lane changes that occur on the right of the vehicle are redundant for the exact determination of the position, because the total number of lanes is always known, and, thus, it is possible to infer a change in the lane situation on the right of the vehicle from the difference between the current lane and the total number of all lanes on the segment.

Then, the knowledge about the current lane 13 and the interconnection between the individual lanes and the following road segments is used in the next pass through the proposed procedure (in particular, its step MM2), in order to improve the results of the first step MM1—that is, the classical map matching procedure (see signal flow arrow from block "current lane" 13 to block "traffic lane model" 7).

The lane model can be used to limit the selection of any possible sequential segment, starting from the last determined position —that is, the road segment and lane. Precisely in ambiguous road situations, such as on the exit and entrance ramps of highways, knowledge about the current lane and the connectivity and/or interconnection of lanes of the individual segments helps to significantly improve the decision about the new position. For example, the only alternative is that the vehicle has left a highway, on which it was previously traveling, if, in so doing, it drove onto the exit ramp.

Furthermore, the traffic lane model, in particular the information therein about the interconnections between the lanes and the sequential segments, makes it easier to estimate already in advance and/or to determine in the next pass the road segment, on which it is most likely that the vehicle will be traveling next and/or in the near future. For example, it is most likely that the vehicle will turn off, if in the last pass the vehicle was in a turn lane. A lane can be classified as a turn lane in such a manner that it can be checked for plausibility and/or redundancy, if desired, by means of additional information regarding the usage restriction of a lane. This information is obtained on the basis of a sensor and/or contained in the traffic lane model.

At this point a projection of the position of the motor vehicle (see block 8 "projection of the position") has to take place in the second step MM2 of the proposed method—at variance with the prior art—not on the inexact basis of road segments, but rather on the refined basis of the traffic lane model 7. This 7 model enables a lane-specific determination of the current position of the vehicle (see block 9 "current position").

The proposed method is capable of determining the lane in which the vehicle is currently traveling. The knowledge about the current lane enables, besides the knowledge about the road on which the vehicle is traveling, a plurality of new possibilities for future driver assistance and driver information systems. It enables, in particular, the practical but difficult to implement lane-specific navigation that is often discussed in the technical literature.

Another application for the knowledge about the lane, in which the vehicle is currently traveling, and which is obtained by way of the invention, is the situation-dependent selection of information output to the driver and/or the determination of suitable points in time for presenting certain information. For example, a driver in the right lane of a highway would presumably be more interested in information about the facilities at the next motor vehicle service area and/or parking lot than a driver in the left lane of the same highway. Even the history, in particular the most recent history, of the lane and/or lanes, in which the vehicle is traveling, can be included in the respective information display selection algorithms and/or information display timing algorithms (if, for example, a driver, traveling on a highway, has changed to the right lane just before an exit and if he has also reduced his speed, then he is planning with a certain degree of probability to leave the highway at this exit).

Since the lane information can be fed back into the system and used in the subsequent operating cycle, the proposed method leads to an improvement of the map matching results over the known methods. Above all, in complex and ambiguous traffic situations a map matching system that has knowledge of the lane in which the vehicle is momentarily traveling has a better chance of forming an allocation of the position of the vehicle in the digital map.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method intended for position determination of a motor vehicle, the method comprising the acts of:
   satellite based determining of a geographical position of the motor vehicle;
   providing digital road map data, which includes at least information about road segments in a vicinity of the geographical position; and
   carrying out a first determining act for determining at least a first road segment, on which the motor vehicle is located with high probability, wherein the first determining act is based on a matching of the geographical position with the digital road map data;
   retrieving traffic lane data, regarding at least a number of traffic lanes for the first road segment, from a road map database;
   determining a traffic lane, in which the motor vehicle is currently traveling utilizing a vehicle on-board camera;
   carrying out a second determining act for determining a second road segment, on which the motor vehicle is currently located with high probability, wherein the second determining act is based on a matching of the geographical position with the digital road map data and at least the traffic lane in which the vehicle is traveling, wherein
   for the purpose of the second determining act, a traffic lane model of the first road segment is created based on the traffic lane data,
   the determination of the lane, in which the motor vehicle is currently traveling, is carried out based on information of the traffic lane model,
   the traffic lane model comprises information regarding the number of traffic lanes of the first road-segment,
   the traffic lane model comprises information regarding exclusion and inclusion of traffic lanes within the first road segment,
   the output of the first determining act is further used as input for the second determining act, and
   the traffic lane model includes instructions regarding a user restriction for a specific lane.

2. The method according to claim 1, wherein the second determining act is based on a matching of the geographical position with the digital road map data, the traffic lane, in which the vehicle is traveling, and at least additional traffic lane information.

3. The method according to claim 2, wherein the determination of the traffic lane, in which the motor vehicle is currently traveling, takes place-utilizing the traffic lane data.

4. The method according to claim 1, wherein the determination of the traffic lane, in which the motor vehicle is currently traveling, takes place utilizing the traffic lane data.

5. The method according to claim 1, wherein the traffic lane model comprises information regarding the exclusion and inclusion of traffic lanes with respect to at least one adjacent road segment.

6. The method according to claim 5, wherein the traffic lane model comprises information regarding the exclusion and inclusion of traffic lanes with respect to a road segment, on which the vehicle has traveled before.

7. The method according to claim 6, wherein a road segment on which the vehicle has traveled before is a road segment last traveled by the vehicle.

8. The method according to claim 6, wherein the traffic lane model comprises information regarding the interconnections between the first road segment and other road segments.

9. The method according to claim 8, wherein the traffic lane model comprises information regarding at least one of a course and arrangement of lanes on the first road segment.

10. The method according to claim 1, wherein the traffic lane model comprises information regarding exclusion and inclusion of traffic lanes with respect to a road segment, on which the vehicle has traveled before.

11. The method according to claim 1, wherein the traffic lane model comprises information regarding the interconnections between the first road segment and other road segments.

12. The method according to claim 1, wherein the traffic lane model comprises information regarding at least one of a course and arrangement of lanes on the first road segment.

13. The method according to claim 1, wherein the second road segment is a more accurate model of the first road segment.

14. A method for determining a position of a motor vehicle equipped with a satellite-based vehicle navigation system, the method comprising the acts of:

in a first process, determining at least a first road segment on which the motor vehicle is located with high probability using the vehicle navigation system by matching a geographical position with digital road map data containing information about road segments in a vicinity of the geographical position; and in a second process, determining a second road segment on which the motor vehicle is currently located with high probability based on a matching of the geographical position with the digital road map data and at least a traffic lane in which the vehicle is traveling, said traffic lane being determined utilizing a vehicle on-board camera, wherein for the purpose of the second process, a traffic lane model of the first road segment is created based on traffic lane data, the determination of the traffic lane, in which the motor vehicle is currently traveling, is carried out based on information of the traffic lane model, the traffic lane model comprises information regarding the number of traffic lanes of the first road-segment, the traffic lane model comprises information regarding exclusion and inclusion of traffic lanes within the first road segment, the output of the first process is further used as input for the second process, and the traffic lane model includes instructions regarding a user restriction for a specific lane.

15. The method according to claim 14, wherein the determination of the traffic lane comprises the act of utilizing traffic lane data retrieved from a digital road map database.

16. The method according to claim 14, wherein the second road segment is a more accurate model of the first road segment.

17. A method intended for position determination of a motor vehicle, the method comprising the acts of:

satellite based determining of a geographical position of the motor vehicle;

providing digital road map data, which includes at least information about road segments in a vicinity of the geographical position; and carrying out a first determining act for determining at least a first road segment, on which the motor vehicle is located with high probability, wherein the first determining act is based on a matching of the geographical position with the digital road map data;

retrieving traffic lane data, regarding at least a number of traffic lanes for the first road segment, from a road map database;

determining a traffic lane, in which the motor vehicle is currently traveling, utilizing a vehicle on-board camera; and carrying out a second determining act for determining a second road segment, on which the motor vehicle is currently located with high probability, wherein the second determining act is based on a matching of the geographical position with the digital road map data and at least the traffic lane in which the vehicle is traveling, the second road segment is a more accurate model of the first road segment, and the traffic lane model includes instructions regarding a user restriction for a specific lane.

\* \* \* \* \*

UNITED STATES PATENT AND TRADEMARK OFFICE
CERTIFICATE OF CORRECTION

| | | |
|---|---|---|
| PATENT NO. | : 9,291,462 B2 | Page 1 of 1 |
| APPLICATION NO. | : 13/021205 | |
| DATED | : March 22, 2016 | |
| INVENTOR(S) | : Jansen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 766 days.

Signed and Sealed this
Sixteenth Day of August, 2016

Michelle K. Lee
*Director of the United States Patent and Trademark Office*